United States Patent [19]

Engelhardt et al.

[11] Patent Number: 4,966,509
[45] Date of Patent: Oct. 30, 1990

[54] POWER BROACH SYSTEM

[75] Inventors: John A. Engelhardt; Richard R. Tarr, both of Warsaw, Ind.

[73] Assignee: Boehringer Mannheim Corporation, Indianapolis, Ind.

[21] Appl. No.: 416,039

[22] Filed: Oct. 2, 1989

[51] Int. Cl.$^5$ ............................................. B23D 41/08
[52] U.S. Cl. .................................................... 409/281
[58] Field of Search ............... 409/281, 282, 283, 296, 409/279, 280; 74/828, 835, 836; 606/80, 96

[56] References Cited

U.S. PATENT DOCUMENTS

| | | | |
|---|---|---|---|
| 1,328,281 | 1/1920 | Hanson | 409/281 X |
| 2,551,359 | 5/1951 | Bannow et al. | 409/280 |
| 2,862,423 | 12/1958 | Warren et al. | 409/296 |
| 3,881,398 | 5/1975 | Gravagne | 29/57 X |

Primary Examiner—William Briggs
Attorney, Agent, or Firm—Perman & Green

[57] ABSTRACT

A transmission for converting rotary motion to simultaneous reciprocating motion of a tool in two mutually transverse directions. A driver is selectively attached to one end of an input shaft and the opposite end of the input shaft terminates at an eccentric cam. An output shaft extends between a driven end and a working end. The driven end is apertured to rotatably receive the eccentric cam and the output shaft is slidably received in the diametrically extending bore of a spherical bearing member. Upon rotation of the input shaft, the working end of the output shaft is caused to reciprocate toward and away from the input shaft and, simultaneously, laterally relative to a longitudinal axis of the input shaft. The working end of the output shaft may be provided with appropriate cutting teeth to enable its use, for example, as a power broach for the precise removal of bone to enable proper implantation of a prosthetic device. In another embodiment, the working end may be movable in three mutually transverse directions.

17 Claims, 4 Drawing Sheets

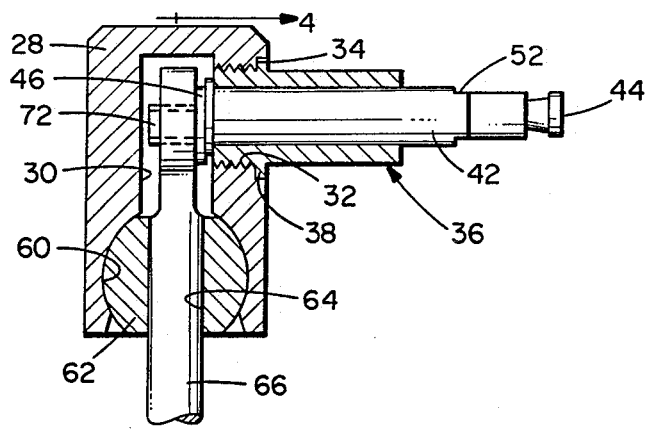
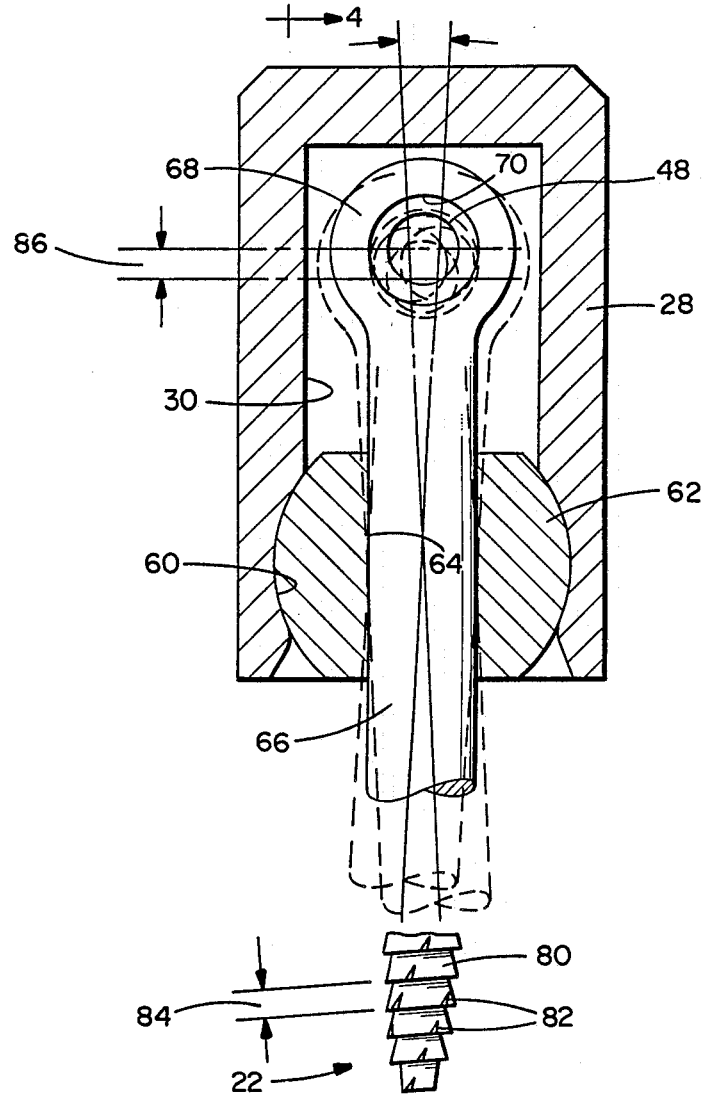

POWER BROACH SYSTEM

BACKGROUND OF THE INVENTION

1. Field of the Invention

The present invention relates generally to surgical tools and, more particularly, to a power broach which is subjected to reciprocating motion in at least two mutually transverse directions.

2. Description of the Prior art

Implantation of a prosthetic device in the human skeleton requires that precise removal of bone in the shape of the implanted device be performed to ensure proper fixation and useful life of the implant. A broach is a tapered and serrated tool primarily used to shape or enlarge a hole and is commonly used to prepare bone to receive an implant.

Classically, such forming of bone depended highly on the technical skills of the surgeon to accurately fit a device. Reciprocating saws, power burrs, curets, rongeurs, and the like, as well as hand operated broaches, were used to manually form the complex shapes in the host bone required for proper fit of an implant.

Typical of known forms of broaching tools is that disclosed in U.S. Pat. No. 2,517,358 which discloses a broaching attachment to a conventional type of drill press. Upon rotation of the drill press chuck, a connecting rod causes reciprocation of the broaching tool shank in a guide socket imparting a cutting motion to the teeth of the broach. U.S. Pat. No. 4,111,208 discloses a specialized surgical tool which may be used as a broach. It utilizes an eccentric to transform unidirectional rotary movement to alternating or reciprocating movement.

However, no power tool known to the inventor has the ability of forming three dimensional shapes impressed into bone for fitting prostheses and implant devices, enabling such a result in an efficient and time saving manner. It was in light of the need which existed and the condition of the prior art which resulted in the conception and reduction to practice of the present invention.

SUMMARY OF THE INVENTION

The invention herein described provides a tool by which three dimensional shapes can be broached into the host bone thereby eliminating the highly subjective technique previously required of surgeons in such operations. The invention utilizes a transmission that interfaces with standard rotary power tools available to the surgeon in the operating room. The transmission converts the rotary power tool motion to reciprocating vibratory motion in at least two transverse directions. When a broach of the dimensions of the implant is attached to the output end of the transmission, a planar circular motion of the broach is produced which consists of a simultaneous push-pull motion and a side-to-side motion. Classical hand broaching or power broaching incorporates a push-pull motion only which produces inefficient cutting of the bone, loading of the broach teeth, and poor broach life. In the invention, however, the side-to-side motion saws the bone by shearing, and clears the teeth for the push-pull cutting stroke. Furthermore, by adjusting the extent of the side-to-side motion for a given broaching operation, a uniform clearance around the implant can be maintained. This is of significant importance in cemented applications as it has been shown that a highly uniform cement mantle of specified thickness is indicated for implant integrity over both the long term and the short term.

In one embodiment, the invention comprises an input shaft, an output shaft, a main body, and a swivel bearing. The input shaft attaches to any standard operating room power tool by way of a hudson adapter. The opposite end of the input shaft has an offset cam which is operatively connected with the output shaft. The length of the push-pull stroke is determined by the offset dimension and is at least equal to pitch of the broach teeth. The output shaft exits the main body through the swivel bearing. The swivel bearing allows the output shaft to slide freely on the push-pull stroke and also allows unencumbered reciprocating rotation about the center of the swivel bearing.

The amount of side to side motion of the broach is a function of: (1) the offset cam distance, (2) the distance from the input shaft to the center of the swivel bearing, and (3) the distance from the center of the swivel bearing to the broach. The first two parameters may be fixed for the device, while the third may be adjustable as by means of a threaded connection with a hudson adapter on the output end. The main body must be sufficiently massive to provide a high moment of inertia to the broaching forces. Without sufficient mass, when the broach is loaded down, movement of the power tool/power broach unit will decrease the efficiency of cutting.

The cutting tooth design of the broach is specific to the particular implant. In typical fashion, a broach may actually be formed from an implant casting. A Hudson adapter may be utilized to allow quick coupling of the broach to the transmission. The tooth design is such that rows of cutting teeth are oriented obliquely to the push-pull axis of the power broach. Continuous longitudinal interruptions may also be employed, again slightly oblique to the push-pull axis, to allow automatic and continued clearing of the teeth during broaching.

The power broach system of the invention may be made of any non corrosive materials suitable for autoclave sterilization.

While the system allows impression of any three dimensional shape into bone, it opens up new possibilities in implant designs which may have previously been disregarded due to the difficulty of making the cuts necessary to fit a particular implant.

Other and further features, advantages, and benefits of the invention will become apparent in the following description taken in conjunction with the following drawings. It is to be understood that the foregoing general description and the following detailed description are exemplary and explanatory but are not to be restrictive of the invention. The accompanying drawings which are incorporated in and constitute a part of this invention, illustrate one of the embodiments of the invention, and, together with the description, serve to explain the principles of the invention in general terms. Like numerals refer to like parts throughout the disclosure.

BRIEF DESCRIPTION OF THE DRAWINGS

FIG. 3 is a side elevation view, in section, of the construction illustrated in FIG. 2;

FIG. 4 is a detail side elevation view, partly in section showing successive positions of certain movable components therein, generally along line 4—4 in FIG. 3;

DETAILED DESCRIPTION OF THE PREFERRED EMBODIMENTS

Figure 1:
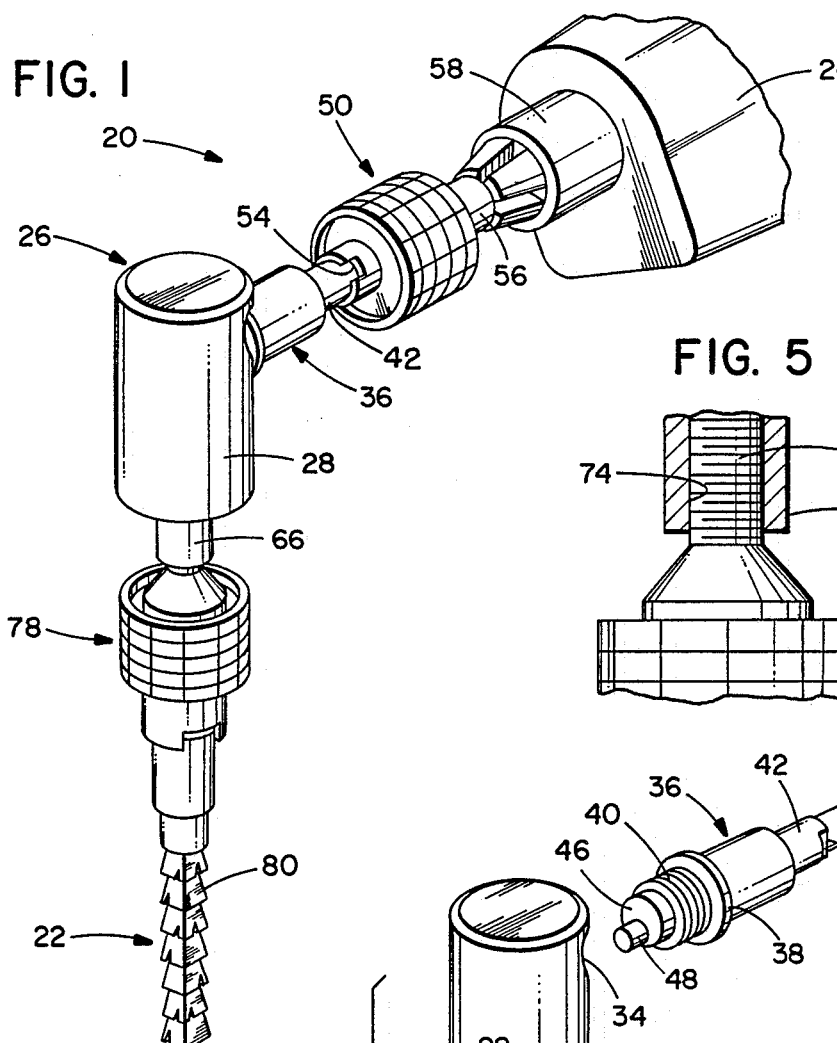
FIG. 1 is a perspective view illustrating a power broach system embodying the present invention.

Turn now to drawings and, initially, to FIG. 1 which illustrates a surgical tool in the form of a power broach system 20 which embodies the present invention. According to the invention, a broach 22, which may be of known design, is operated by a power tool 24 commonly available in an operating room for a variety of surgical procedures. A transmission 26 having unique characteristics of both design and operation is interposed between the power tool 24 and the broach 22. In a manner to be described, the transmission 26 converts the rotary motion imparted by the power tool 24 to simultaneous reciprocating motion of the broach 22 in at least two mutually transverse directions.

Figure 2:
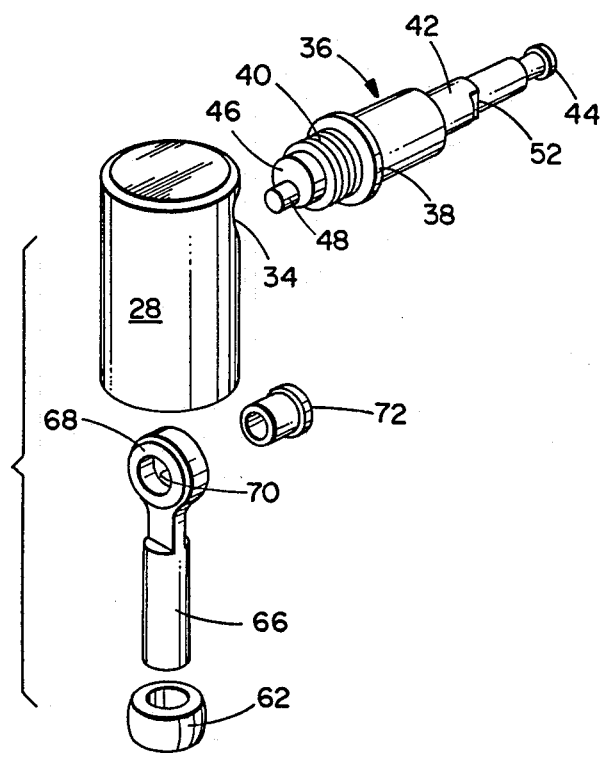
FIG. 2 is a partially exploded view, in perspective, of certain of the components illustrated in FIG. 1.

Reference is now made to FIGS. 2 and 3 as well as to FIG. 1 The transmission 26 includes a housing 28 machined from a sufficiently massive block of metal which, together with the power tool 24, effectively resists movement such that motion of the broach 22 relative to the bone is enhanced. By way of example, the housing may be machined from stainless steel and has an internal cavity 30, a tapped through bore 32, and a counterbore 34 associated with the bore 32 (FIG. 3). A journal 36 which may be of brass, bronze, or other suitable journal bearing material, has a collar 38 intermediate its ends and one end is threaded, as at 40 (FIG. 2) adjacent the collar 38, for threaded engagement with the tapped through bore 32.

An input shaft 42 is rotatably mounted within the journal 36 and extends between a quick release annular flange 44 at one end and an opposite flanged end having a transverse surface 46 from which protrudes an eccentric cam member 48. The end of the input shaft 42 which includes the annular flange 44 is received within a Hudson adapter 50. In a known manner, the annular flange 44 interacts with the hudson adapter to selectively prevent longitudinal movement therebetween. Diametrically opposed flats 52 on the input shaft 42 cooperate with associated slots 54 of the hudson adapter 50 to rotationally key the input shaft to the hudson adapter. In turn, an opposite end 56 of the hudson adapter 50 is suitably connected, by way of a releasable chuck 58, to the power tool 24. In this way, the input shaft 42 can be releasably connected to the power tool 24 for rotation whenever the power tool is energized. As seen especially well in FIG. 2, a cam member 48 is cylindrical, that is, has a circular cross section, and protrudes from the end surface 46 so as to have a longitudinal axis which is parallel to, but spaced from, that of the input shaft 42.

Viewing FIGS. 3 and 4, the housing 28 is provided with a spherical bearing surface 60 at a location distant from the through bore 32 and in communication with the internal cavity 30. A spherical bearing member 62 composed of high density polyethylene or other suitable material is rotatably received in contiguous relationship with the bearing surface 60. The bearing member 62 is provided with a diametrically extending bore 64 which slidably receives an output shaft 66 intermediate its ends. The output shaft 66 extends between a distal working end to which is ultimately attached the broach 22 and a proximal driven end which terminates at a yoke 68 defining a transverse bore 70. A flanged bushing 72 (see especially FIG. 2) is rotatably received on the cam member 48 and, in turn, is rotatably received within the transverse bore 70. As in the instance of the journal 36, the bushing 72 may be composed of brass, bronze, or other suitable journal bearing material.

Figure 5:
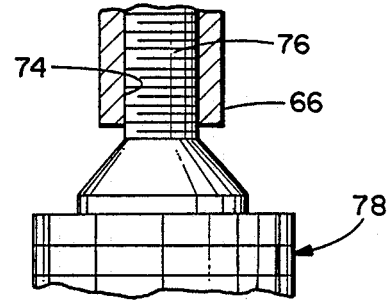
FIG. 5 a detail side elevation view, partly in section, illustrating components shown in FIG. 1.

The terminal end of the output shaft 66 has a drilled and tapped bore 74 (FIG. 5) for threadedly receiving a stud 76 of a hudson adapter 78, or other suitable coupling mechanism, for selectively connecting the broach 22 to the transmission 26. When so connected, the broach 22 is an integral unit with the output shaft 66 and movable in all respects as a unit with the output shaft.

For its part, referring again to FIG. 4, the broach 22 is seen to include successive rows of sharp-edged cutting teeth 80 which are orientated obliquely to the longitudinal axis of the output shaft 66. The broach 22 is also provided with a plurality of longitudinal interruptions 82, again slightly oblique to the longitudinal axis of the output shaft 66, to allow automatic and continuous clearing of the teeth during the broaching process. As seen in FIG. 4, it will be appreciated that the pitch 84 of the cutting teeth 80 in a direction parallel to the longitudinal axis of the output shaft 66 is no greater than the throw 86 of the cam member 48, that is the maximum distance between the longitudinal axis of the input shaft 42 and that of the eccentric cam member 48. This relationship assures automatic and continuous clearing of the cutting teeth 80 during the broaching process.

In the course of operation of the power broach system 20, it will be appreciated that the regular and continuous rotation of the input shaft 42 results, simultaneously, in a reciprocating motion of the broach 22 both toward and away from the input shaft 42 and laterally with respect to the axes of the input shaft 42. These motions are generally indicated in FIG. 4 which illustrates various positions of the output shaft 66 in the course of rotation of the input shaft 42.

Another embodiment of the invention is illustrated in FIGS. 6-9 which enables the broach 22 to simultaneously be moved in three transverse directions. Specifically, by reason of the construction about to be described, the broach is moved in a reciprocating fashion, simultaneously, in directions (1) generally along the axis of the output shaft, (2) generally parallel to the input shaft, and (3) generally transverse of the axis of the input shaft.

As particularly well seen in FIGS. 6-9, a disk-shaped driver cam 90 is fixed to an end of the input shaft 42 so as to be rotatable with the input shaft. The driver cam 90 has a peripheral edge 92 and a contoured surface 94 facing away from the input shaft 42. The contoured surface 94 includes a pair of generally parallel mounds 96, 98 separated by a diametrically extending valley 100. A post 102 is fixed to the driver cam 90 and extends outwardly from the valley 100 along an axis which is parallel to, but spaced from, the axis of the input shaft 42. A modified output shaft 66A extends along an axis which is generally transverse to that of the input shaft 42 and has a transverse bore 103 allowing it to be freely received on the post 102. A compression spring 104, or other suitable resilient member, is coaxially received on the post 102 and extends between and bears against, respectively, the output shaft 66A and a suitable retainer ring 106 which is fixed near a free end of the post 102.

Figure 6:
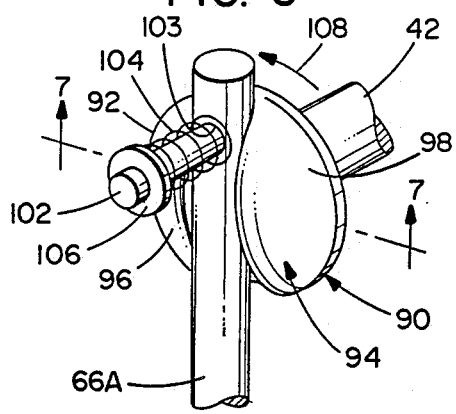
FIG. 6 is a detail perspective view of another embodiment of the invention illustrating one extreme position of the components depicted therein.
Figure 8:
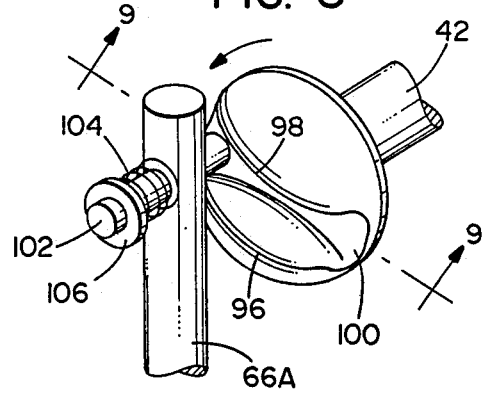
FIG. 8 is a detail perspective view, similar to FIG. 6, illustrating another extreme position of the components depicted therein.
Figure 7:
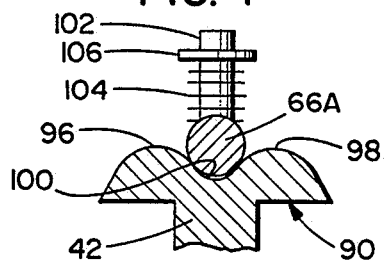
FIG. 7 is a cross section view taken generally along line 7—7 in FIG. 6.
Figure 9:
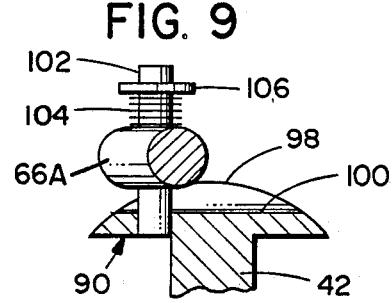
FIG. 9 is a cross section view taken generally along line 9—9 in FIG. 8.
Figure 10A:
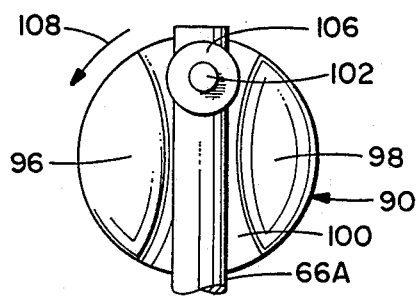
FIGS. 10A, 11A, a 13A are all front elevation views of the components illustrated in FIG. 6, but depicting successive mutual positions of the components therein.
Figure 10B:
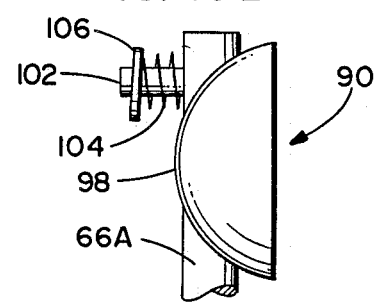
FIGS. 10B, 11B, 12B, and 13B are side elevation views corresponding, respectively, with FIGS. 10A, 11A, 12A, and 13A.
Figure 11A:
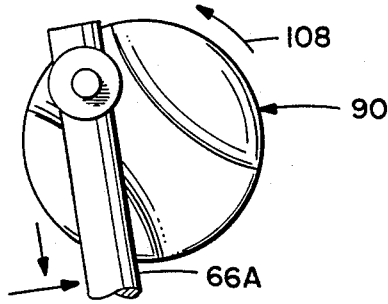
Figure 11B:
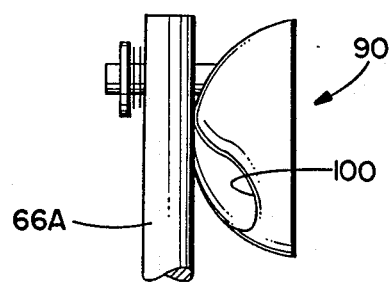
Figure 12A:
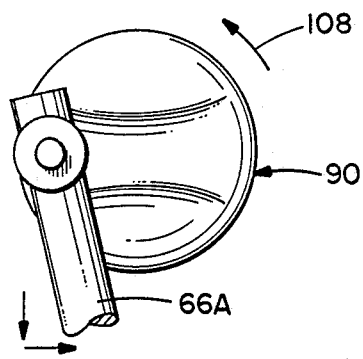
Figure 12B:
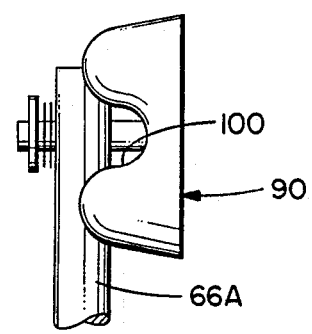
Figure 13A:
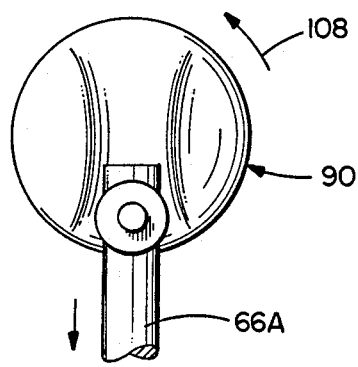
Figure 13B:
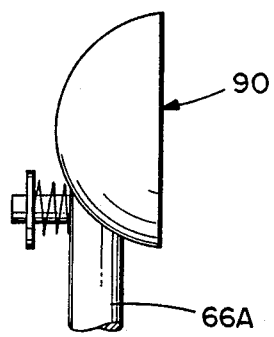

It will be appreciated that the spring 104 biases the output shaft 66A into engagement with the valley 100 as particularly well seen in FIGS. 6 and 7. As the input shaft 42 is rotated in the direction of an arrow 108, the output shaft 66A rides up onto the mound 66 and ascends from the valley 100. This movement continues until the output shaft 66A reaches the maximum height of the mound 96 as generally seen in FIG. 8. An entire sequence of relative positions between the output shaft 66A and the driver cam 90 is depicted in FIGS. 10A thru 13B.

As in the instance of the preceding embodiment, the output shaft 66A extends through the bore 64 in the spherical bearing member 62 and is provided with a broach 22 at its extreme working end. By reason of the mechanism just described, rotation of the input shaft 42 imparts movement to the output shaft which results in reciprocating movement, simultaneously, of the broach in a controlled manner in three mutually perpendicular directions as noted previously.

While preferred embodiments of the invention have been disclosed in detail, it should be understood by those skilled in the art that various other modifications may be made to the illustrated embodiments without departing from the scope of the invention as described in the specification and defined in the appended claims.

What is claimed is:

1. Apparatus for converting rotary motion to simultaneous reciprocating motion in at least two mutually transverse directions comprising:
   a transmission housing having an internal cavity;
   an input shaft having a first longitudinal axis rotatably mounted about said first longitudinal axis on said transmission housing extending between a first end distant from said transmission housing adapted for releasable attachment to a driver and a second end received in the internal cavity, said second end including a driver cam having a second longitudinal axis parallel to and offset from said first longitudinal axis;
   a spherical bearing member having a center of rotation and a diametrically extending bore therethrough, said bearing member being rotatably mounted about said center of rotation on said transmission housing proximate to the internal cavity; and
   an output shaft having a third longitudinal axis transverse to said first and second longitudinal axes slidably received in the diametrically extending bore extending between a distal working end and a proximal end within the internal cavity having a transverse bore therein for rotatable reception of said driver cam member;
   whereby rotation of said input shaft results in simultaneous reciprocating motion of said output shaft along the diametrically extending bore and reciprocating motion of said working end through an arc the center of which is said center of rotation of said spherical bearing.

2. Apparatus as set forth in claim 1 including:
   bearing means on said transmission housing mounting said input shaft for rotation relative to said housing;
   said spherical bearing member mounting said output shaft intermediate said working end and said driven end.

3. Apparatus as set forth in claim 2
   wherein said second end of said input shaft terminates at a transverse end surface, said driver cam including an eccentric cam member protruding from said end surface in a direction away from said end surface in a direction away from said first end; and
   wherein said driven end of said output shaft has an aperture transverse of said third longitudinal axis, said eccentric cam member being freely received in the aperture;
   whereby rotation of said input shaft imparts, simultaneously, reciprocating motion of said output shaft along said third longitudinal axis and rocking motion of said output shaft about said center of rotation of said spherical bearing member.

4. Apparatus as set forth in claim 3
   wherein said working end includes a cutting member having successive rows of sharp-edged teeth thereon for cutting into an object, the pitch of said teeth in a direction parallel to said third longitudinal axis being no greater than the offset distance between said first and second longitudinal axes.

5. Apparatus for converting rotary motion to simultaneous reciprocating motion in at least two mutually transverse directions comprising:
   an input shaft rotatable about a first longitudinal axis and including a driver cam having a second longitudinal axis parallel to and offset from said first longitudinal axis;
   an output shaft having a third longitudinal axis transverse to said first longitudinal axis and including a working end and a driven end distant from said working end operatively engageable with said eccentric cam member; and
   transmission means coupling said input shaft and said output shaft for movement of said working end in longitudinally opposed directions toward and away from said input shaft and in laterally opposed directions relative to said input shaft.

6. Apparatus as set forth in claim 5
   wherein said input shaft includes:
   a first end adapted for releasable attachment to a driver; and
   a second end opposite said first end including said driver cam thereon; and
   wherein said transmission means includes:
   a housing having an internal cavity;
   first bearing means mounting said input shaft for rotation relative to said housing, said second end being distant from said housing, said first end being within the internal cavity; and
   second bearing means mounting said output shaft intermediate said working end and said driven end.

7. Apparatus as set forth in claim 6 wherein said second bearing means includes:

a spherical bearing member having a center of rotation and a diametrically extending bore therethrough, said bearing member being rotatably mounted about said center of rotation on said housing proximate to the internal cavity;

said output shaft being slidably received in the diametrically extending bore intermediate said working end and said driven end.

8. Apparatus as set forth in claim 7
wherein said second end of said input shaft terminates at a transverse end surface, said driver cam including an eccentric cam member protruding from said end surface in a direction away from said first end; and wherein said driven end of said output shaft has an aperture transverse of said third longitudinal axis, said eccentric cam member being freely received in the aperture;

whereby rotation of said input shaft imparts simultaneously reciprocating motion of said output shaft along said third longitudinal axis and rocking motion of said output shaft about said center of rotation of said spherical bearing member.

9. Apparatus as set forth in claim 5
wherein said working end includes a cutting member having successive rows of sharp-edged teeth thereon for cutting into an object, the pitch of said teeth in a direction generally parallel to said third longitudinal axis being no greater than the offset distance between said first and second longitudinal axes.

10. Apparatus as set forth in claim 5
wherein said driver cam is disk-shaped and fixed to said input shaft and lies generally in a plane perpendicular with said first longitudinal axis, said driver cam having a contoured operating surface;

wherein said working end of said output shaft has an aperture transverse of said third longitudinal axis; and wherein said eccentric cam member includes a post freely received through the transverse aperture and resilient means on said post biasing said working end of said output shaft into engagement with said contoured operating surface; and including:

bearing means distant radially of said input shaft and generally encompassing said output shaft intermediate said working end and said driven end freely permitting reciprocating movement of said output shaft while restricting lateral movement of said output shaft;

whereby rotation of said input shaft results in reciprocating motion of said working end along three mutually perpendicular axes.

11. Apparatus for converting rotary motion to reciprocating motion comprising:
an input shaft rotatable about a first longitudinal axis;
an output shaft extending transverse of said input shaft; and
transmission means coupling said input shaft and said output shaft resulting in reciprocating motion of said output shaft in a plane transverse of said first longitudinal axis upon rotation of said input shaft, said transmission means including:
an eccentric cam member having a second longitudinal axis parallel to and offset from said first longitudinal axis;

said output shaft having a third longitudinal axis transverse to said first longitudinal axis and including:
a working end; and
a driven end distant from said working end and operatively engaged with said eccentric cam member;
whereby rotation of said input shaft results in movement of said working end in longitudinally opposed directions toward and away from said input shaft and in laterally opposed directions relative to said input shaft.

12. Apparatus for converting rotary motion to reciprocating motion comprising:
an input shaft rotatable about a first longitudinal axis:
an output shaft extending transverse of said input shaft; and
transmission means coupling said input shaft and said output shaft resulting in reciprocating motion of said output shaft in a plane transverse of said first longitudinal axis upon rotation of said input shaft;
wherein said output shaft has a third longitudinal axis transverse to said first longitudinal axis and extending between a working end and a driven end, said driven end, said driven end having a bore transverse to said third longitudinal axis; and
wherein said transmission means includes:
a disk-shaped driver cam fixed to an end of said input shaft for rotation therewith having a peripheral edge and a contoured surface facing away from said input shaft, said contoured surface including a pair of generally parallel mounds separated by a diametrically extending valley;
a post fixed to said driver cam and extending outwardly from said valley along a second axis parallel to but spaced from said first axis; and said post being journaled in the transverse bore of said output shaft;
resilient means biasing said output shaft at said post into engagement with said valley; and
a spherical bearing member having a center of rotation and a diametrically extending bore therethrough, said bearing member being positioned at a location distant from said input shaft, said output shaft being slidably received in the bore of said spherical bearing intermediate said working end and said driven end;
whereby rotation of said input shaft imparts movement to said output shaft between a first position lying in said valley and a second position engaged with one of said mounds such that said working end is caused to move reciprocably simultaneously in a controlled manner in three mutually perpendicular directions.

13. Apparatus as set forth in claim 11 wherein said working end includes a cutting member having successive rows of sharp-edged teeth thereon for cutting into an object, the pitch of said teeth in a direction parallel to said third longitudinal axis being no greater than the offset distance between said first and second longitudinal axes.

14. Apparatus as set forth in claim 11
wherein said input shaft includes:
a first end adapted for releasable attachment to a driver; and
a second end opposite said first end including said eccentric cam member thereon; and
wherein said transmission means includes:
a housing having an internal cavity;

first bearing means mounting said input shaft for rotation relative to said housing, said first end being distant from said housing, said second end being within the internal cavity; and second bearing means mounting said output shaft intermediate said working end and said driven end.

15. Apparatus as set forth in claim 14 wherein said second bearing means includes:

a spherical bearing member having a center of rotation and a diametrically extending bore therethrough, said bearing member being rotatably mounted about said center of rotation on said housing proximate to the internal cavity; said output shaft being slidably received in the diametrically extending bore intermediate said working end and said driven end.

16. Apparatus as set forth in claim 15 wherein said second end of said input shaft terminates at a transverse end surface, said eccentric cam member protruding from said end surface in a direction away from said first end; and wherein said driven end of said output shaft has an aperture transverse of said third longitudinal axis, said eccentric cam member being freely received in the aperture; whereby rotation of said input shaft imparts simultaneously reciprocating motion of said output shaft along said third longitudinal axis and rocking motion of said output shaft about said center of rotation of said spherical bearing member.

17. Apparatus as set forth in claim 12 wherein said input shaft is selectively attached to a source of power; and wherein said working end of said output shaft includes a cutting member having successive rows of sharp-edged teeth thereon for cutting into an object, the pitch of said teeth in a direction generally parallel to said third longitudinal axis being no greater than the offset distance between said first and second longitudinal axes.

* * * * *